June 14, 1960 W. F. SCHREIBER 2,941,040
BANDWIDTH REDUCTION SYSTEM
Filed Jan. 31, 1958
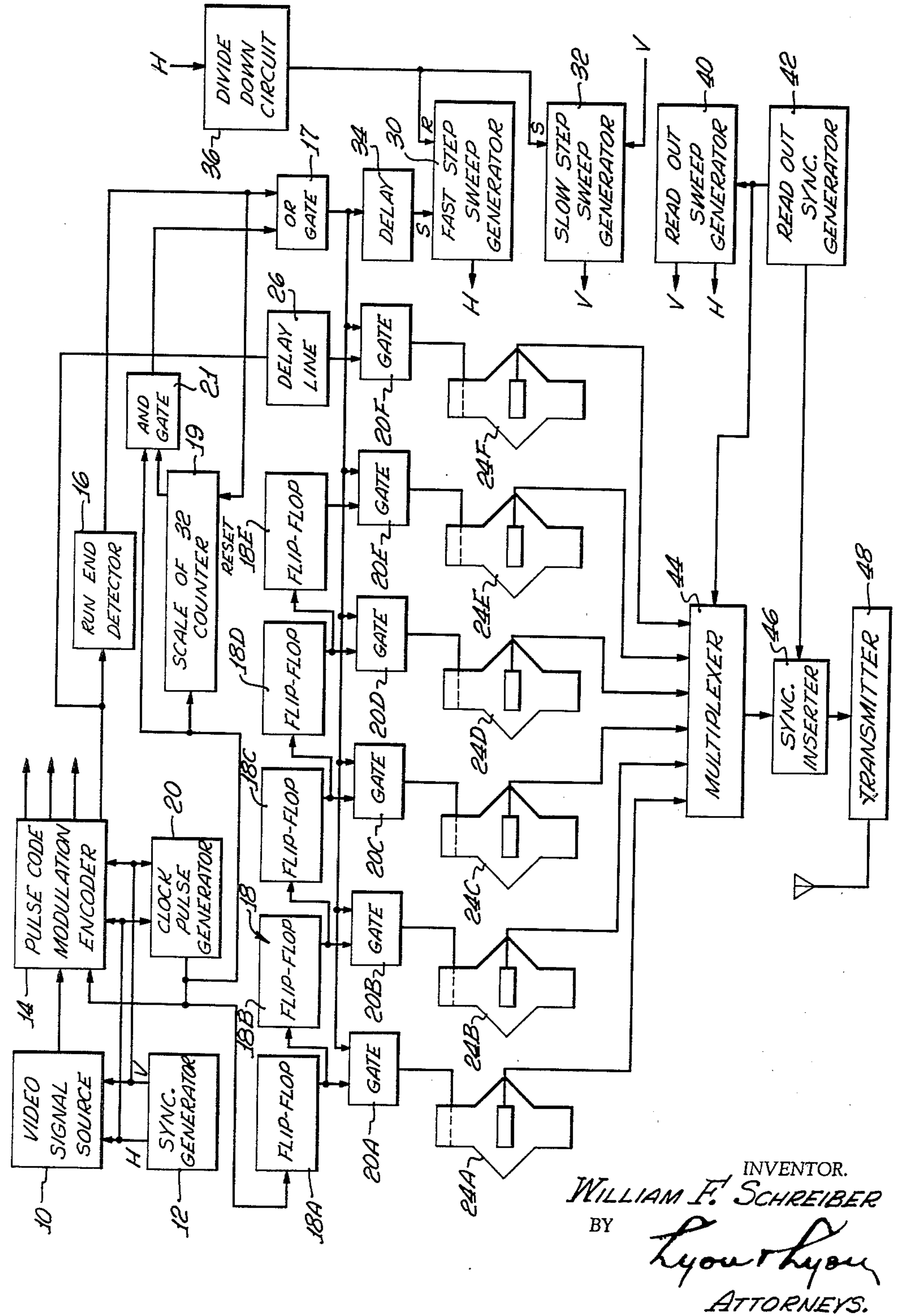
INVENTOR.
WILLIAM F. SCHREIBER
BY
Lyon & Lyon
ATTORNEYS.

2,941,040

BANDWIDTH REDUCTION SYSTEM

William F. Schreiber, Los Angeles, Calif., assignor to Technicolor Corporation, Hollywood, Calif., a corporation of Maine Filed Jan. 31, 1958, Ser. No. 712,569
4 Claims. (Cl. 179—15.55)

This invention relates to a signal bandwidth reduction system and, more particularly, to an improvement therein.

In an application for a bandwidth reduction system by this inventor, Ser. No. 613,234, filed October 1, 1956, there is described an arrangement wherein bandwith reduction of signals, such as video signals, is accomplished by first applying these signals to a pulse-code modulation system which provides as an output numbers representative of the level of the samples of the original signal. These numbers are binary in form and comprise a plurality of binary digits. Each one of these digits is thereafter monitored to determine the interval of time it remains unchanged. Both a digit an an associated second number representative of the interval of time during which the digit remains unchanged are stored. Thereafter, these digits and associated second numbers may be read out of storage and transmitted, without any time interval between them other than that required to read them out in succession. At the receiver, the incoming digits and associated second numbers are stored in the order received. Means are provided for reading each digit out and generating an interval for the existence of that digit in accordance with the information conveyed in the associated second number. All the digits are applied to a pulse-code modulation decoder for the intervals which have been generated. The output of the pulse-code modulation decoder will then represent the initial signal.

At the transmitter, in order to obtain a second number truly representative of the duration of an unchanged digit or first number, there is employed a clock-pulse generator which has its output applied to drive a cyclic counter. Each time a digit changes, the count indication of the counter represents a number called a second number which is indicative of the duration of the digit. At the receiver, a synchronized clock-pulse generator and counter are enabled to generate a corresponding interval by initiating the operation of the counter from the same starting position as the counter in the transmitter and by sensing when the counter attains the count equivalent to the value of the second number.

Since the counter at the transmitter is cyclic in operation, in order to preserve unambiguity in the information recorded as second numbers, each time the counter fills or attains its maximum count, a recording is made of that maximum count and of the first number, or digit value, at that time. Thus, when the counter is recycled, it starts running again, and the circuitry can continue to function as described without any ambiguity in the information being provided.

The duration of the intervals during which there is no change in the digits are known as runs, and this type of coding is designated as run-length coding. In a video picture of substantial complexity, approximately 10,000 runs can be expected to occur per frame. In order to cut down on the number of "full counter" conditions, and thereby the amount of both recording space and channel space required for transmission of the full-counter information, the size of the counter may be extended. However, this is not desirable, since effectively it increases the amount of information which must be recorded and transmitted in order to handle the higher count conditions of the increased size counter.

It is an object of this invention to decrease the number of "full counter" conditions which must be recorded in the course of a long run without increasing the complexity of the system.

Another object of this invention is to reduce the number of "full counter" conditions which must be recorded while still preserving the unambiguity of information indicated thereby.

Still another object of the present invention is to provide an improvement in a run-length coding system whereby the bandwidth required for transmission of the coded information may be reduced still further without losing any of the information required for reconstructing the signal.

These and other objects of this invention are achieved in a run-length coding system of the type described by providing an arrangement for indicating when a run-length equals the capacity of the counter being used for measuring run-length intervals. At that time, the recording apparatus is energized to record the first number, or digit, and the second number, or count of the counter.

The novel features that are considered characteristic of this invention are set forth with particularity in the appended claims. The invention itself, both as to its organization and method of operation, as well as additional objects and advantages thereof, will best be understood from the following description when read in connection with the accompanying drawing, which is a block diagram of a run-length coding system, including this invention.

Except for the improvement comprising this invention, the figure of the drawing is substantially identical with that shown in Figure 1 of the previously referred to application by this inventor. The reason for substantially reproducing the drawing is in order to facilitate an understanding of this invention.

Referring now to the drawing, there may be seen in block schematic form an embodiment of the arrangement which may be used for encoding television signals. A video-signal source 10 provides the signals to be encoded. This may be a television camera or other source of video signals. A synchronizing generator 12, which is part of the well-known arrangement for obtaining composite television signals, provides horizontal and vertical synchronizing signals. The video-signal source signals, as well as those from the sync generator, are applied to a pulse-code modulation encoder 14. This apparatus is well known and is described, for example, by W. M. Goodall in an article in the Bell System Technical Journal for January 1951, entitled "Television by P.C.M." The pulse-code modulation, or PCM encoder, produces as its output a series of numbers in the form of a simultaneous binary digital output which represents the brightness levels of the video signals. Each digit output is represented by another arrow, shown in the drawing emanating from the rectangle 14. The remainder of the apparatus shown is what is necessary to encode one of the plurality of digits provided by the pulse-code modulation encoder. If it is desired to encode all of the digits, then the apparatus shown in the remainder of the drawing is repeated for each digit. In order to further economize on transmission bandwidths, it may be desirable to omit the least-significant digits, or these may be transmitted at a lower frame rate. However, the explanation that follows will be directed to the encoding of one of the digital outputs, which is a binary (2-valued) video signal.

The binary video signal output of the PCM encoder 14 is fed to a run-end detector 16. This apparatus has the function of producing pulses indicative of the fact that the binary digit signal changes from one binary representation to the other. Since the input is binary, the run-end detector 16 may be simply a differentiating and rectifying circuit which produces a positive output pulse whenever its input changes, either positively or negatively. Other arrangements for detecting a change in a 2-valued input signal are well known in the art and may be employed here for the purpose of providing an output signal indicative of the fact that a change has occurred in the binary input.

Both the pulse-code modulation encoder 14 and a counter 18 are driven by the output of a clock-pulse generator 20. Horizontal and vertical synchronizing signals are fed from the synchronizing generator 12 to both the pulse-code modulation encoder and the clock-pulse generator. In the clock-pulse generator, at the beginning of each active horizontal scanning line, these synchronizing signals initiate a chain of high-frequency pulses. For the coding of a video signal having a four-megacycle bandwidth, usually these clock-pulse generator output signals are at an eight-megacycle rate.

The counter 18, represented in the drawing by the five flip-flop stages, respectively, 18A through 18E, may be any suitable type of counter such as the one which is described and shown in an article in the RCA Review, by Igor Grosdoff, entitled "Electronic Counters," in the September 1946 issue. In this type of counter, input pulses are applied to the first flip-flop, and it drives the succeeding flip-flops in well-known binary fashion. The count condition of the counter is manifested by the pattern of its output voltages. The output of the flip-flops in a counter, represented in the block diagram, consists of output connection from one side of each one of the flip-flops. Each one of these outputs is applied to an associated AND gate 20A through 20E. A second required input to each one of the gates is provided from the run-end detector 16 through the OR gate 17.

The gate circuits 20A through 20E, as well as the OR gate 17, are well-known types of circuits. The AND gate circuits are coincidence circuits which require the simultaneous presence of both of their inputs before they supply any output indicative of one of the inputs. The OR gate is usually known as a buffer circuit and provides an output whenever any one of its inputs is activated. Suitable gate circuits are described and shown in an article entitled "Diode Coincidence and Mixing Circuits in Digital Computers," by T. J. Chen, in the IRE Proceedings, volume 38, pages 511 through 514, for May 1950. The output of the gate circuits 20A through 20E, in the presence of the enabling signal initiated by the run-end detector will be the output applied from the flip-flop, which depends upon whether the flip-flop is in its one or zero condition at the time the enabling pulse is applied to the gate. As many counter stages as are desired may be employed. By way of example, and because the number has been found adequate, five counter stages are shown. These provide a total count of 32 before the counter is filled and starts counting pulses anew.

Since information is being received from the video-signal source at one rate and will be transmitted at a second rate, it is necessary to include in the invention an information reservoir, into which information may be put in short, high-intensity bursts, and out of which information may be taken at a relatively constant rate. One suitable storage system is provided by the Graphechon storage tube, provided electrostatic deflection is used. This is an electrostatic storage tube which has two guns, one for reading and one for writing, both of which functions may be carried out simultaneously and independently. It should be noted, however, that the system may be designed around any type of random-access storage device of adequate resolution, storage capability, access time, and reliability. It is also not necessary that simultaneous reading and writing may occur. Thus, another suitable storage arrangement would be magnetic core storage. The Graphechon is described in an article entitled, "The Graphechon—a Picture Storage Tube," by L. Pensack, in the RCA Review for March 1949.

The counter 18 enters its count condition into five of these electrostatic storage tubes 24A through 24E. The entry of these outputs from the counter occurs at each time the binary digit being encoded changes from one binary manifestation to the other. Also, a sixth storage tube 24F is provided for the purpose of storing the binary number which is the output of the pulse-code modulation encoder and which represents the signal. Thus, the digit line output of the pulse-code modulation which is being run-length coded by this system is applied to a delay line 26, the output of which is applied to a gate 20F. Gate 20F is similar to any one of gates 20A through 20E, and its enabling input is derived from the output of the OR gate 17, similar to the other gates. Thus, at the time the run-end detector opens the gates 20A through 20E, it also opens the gate 20F. The delay line 26 holds the binary digit which was present at the output of the pulse-code modulation encoder just prior to the digit, which is causing the run-end detector to function, long enough so that it is present at the gate 20F when it is opened. The output of gate 20F is inserted into the storage tube 24F at the same time as the output of the counter 18 is inserted into the storage tubes 24A through 24E.

Deflection of the cathode-ray beams in the Graphechon storage tubes 24A through 24F which are employed is made simultaneously by a fast-stepping sweep generator 30 and a slow-step sweep generator 32. The fast-step sweep generator controls the horizontal deflection and the slow-step sweep generator controls the vertical deflection of the beams. The deflection plates of all the tubes are connected in parallel, so that all the beams are at corresponding points of their storage surfaces at the same time.

At the beginning of the frame (of the televison signal), the step sweep generators are reset so that the writing beam is at the upper left-hand corner of the target plate, but the beam is cut off. When the first run is detected, the gates 20A through 20F enable the turning on of the beams for a brief instant, whereby in each tube there is stored either a one or a zero, indicative of the count in the counter at that time, and a one or a zero, indicative of the brightness signal at that time. After a short delay for permitting storage, which is provided by the delay network 34, the fast-step sweep generator is enabled by the signal received to move all the beams to the adjacent storage space which can be considered here as one step to the right or to the next storage element.

The run-end detection pulse which is received through the delay line 34 is applied to the input terminal of the fast-sweep generator, which is labeled as "S," representing the set input terminal. The "R" input terminal represents the reset input terminal. A signal applied to this terminal causes the fast-step sweep generator to perform the operation of moving the cathode-ray beam all the way back to the left. This occurs when an input pulse is received from the divide-down circuit 36. This divide-down circuit is merely a frequency counter chain of the same type as the counter 18, which has applied to its input the horizontal sync pulses and provides a single output at the end of five lines.

When the next run-end is detected, the gates are again opened and storage again takes place. Thereafter, the step sweep generator steps the cathode-ray beam one step to the right to the next storage space.

In order to provide for runs which are longer than the capacity of the counter, as described in the previously mentioned application by this inventor, the counter itself produced a pulse when it filled, which was identical to the run-end pulse. This performs the same functions that the output of the run-end detector 16 performs. As a result, there was entered into the storage tubes 24A through 24F the full count of the counter, as well as the value of the digit at that time. Thereafter, the counter would start running again and run-end detection function would occur as described. In this manner, ambiguity in reproduction from the coded information is avoided. For example, if a run-end occurs when the counter has a count of two and thereafter a digit would not change for 36 clock-pulse intervals or bauds, unless the fact of the full count is recorded the next number which would be recorded would be an eight. Thus, the run interval which would be reproduced would be that in the time between the count of two and the count of eight, which obviously is in error. However, if the number between the two and the eight is a 32, obviously, in reproduction, the interval between the two-count and 32-count would first be reproduced, and thereafter the interval between the 32 and the eight; thus a correct interval for reproducing the run is provided.

To eliminate the requirement for recording the full condition of the counter each time the counter fills, in accordance with this invention an additional counter 19 is provided which may be identical with the counter 18. Like the counter 18, it also is operated or advanced in response to output from the clock-pulse generator 20. Counter 19 is also a cyclic counter like counter 18. However, output is taken from counter 19 only when it fills or attains a 32-count. This output is applied to an AND gate 21, which receives as its second required input a clock pulse from the generator 20. Thus, the first clock pulse received by AND gate 21 after the counter fills results in an output to OR gate 17. The counter is recycled to its "one-count" condition. Thus, whenever a filled condition output of counter 19 is obtained, it introduces the same result as is obtained when an output from the run-end detector occurs. The gates 20A through 20E enter whatever count exists in the counter at that time; the gate 20F will enter the first number, or PCM digit, and the output of the OR gate 17 is also applied to activate the fast-step sweep generator after the recording has been made.

Provision is also made to reset the counter 19 to its "one-count" condition each time a run-end is detected by the run-end detector 16. This is represented by a connection between the output of run-end detector 16 and the reset terminal of counter 19. If the following run is less than 32 bauds, then the run-length coding system operates in the manner described previously, except that should the counter 18 have filled during the following run, this fact is not employed to initiate a recording in the storage tubes. However, should a run-length equal or exceed the capacity of counter 19, which is identical with the full capacity of the counter 18, then the output of the counter 19 is applied through AND gate 21 to the OR gate 17, to thereby initiate a recording operation of the count in the counter 18 and the digit representing the pulse-code modulation output.

The counter 19 is recycled and continues counting. If the run ends before the counter 19 fills again, then the output of the run-end detector will function to reset the counter 19 and enter the first and second numbers at that time into the storage tubes. If the run exceeds the capacity of the counter 19 again, the counter 19, when filled, will again initiate the recording of the first and second number at that time.

It has been estimated that in a complete frame of a television picture about 6,000 "full counter" conditions occur, and a substantial amount of channel space is required for the transmission of that stored information. With the system described, the total required bandwidth for transmission is reduced at least by one-third. An ambiguity is prevented merely by breaking long runs into pieces, each piece being 32 bauds or less in length. There is no alteration required at the receiver to accommodate the improvement achieved by this invention.

To exemplify the improvement achieved, first consider the number of recordings required, for example, by the system without the improvement, for three run lengths. Assume that the counter 18 starts counting from an initial count condition and the first run length ends after 30 bauds from such initial count condition. The number entered into the storage tubes at that time is 30. The next run length ends 35 bauds from the start. Accordingly, when the counter 18 fills, the number 32 is entered into the storage tubes and at the end of the run length the number 3 is entered into the storage tubes. Thereafter, a run length occurs 70 bauds from the initial starting time. Accordingly, the number 32 is entered into the storage tubes the second time that the counter fills, and thereafter the number 6 is entered.

In accordance with this invention, the first number entered into the storage tubes will be 30; 35 bauds from the starting time, the number 3 is entered and the full count of the counter is omitted. Thereafter, at 67 bauds from the starting time, the number entered into the storage tubes will be 2. Thereafter, at 70 bauds from the starting time, the number entered into the storage tubes will be 6.

It will be noted that one entry has been saved into the storage tubes. If a video signal entails a plurality of run lengths of 32 bauds or less, the savings in storage and the subsequent transmission of the contents of the storage tubes is considerable.

In accordance with the description in the previous application by this inventor, one line of a storage tube is used to contain information relative to five lines of the picture. Accordingly, only about 100 lines are required for information storage for each 525-line picture. Thus, the divide-down circuit 36 divides the horizontal sync frequency to provide one output pulse for every five input pulses. For a video picture of substantial complexity, there are 20 runs per television line. Then, about 100 storage positions per line in the storage tube should suffice for five lines of the television picture.

At the time that the divide-down circuit 36 supplies an output pulse to reset the fast-step sweep generator 30, the same output pulse is applied to the slow-step sweep generator 32, to cause it to provide the necessary signals to move the cathode-ray beams and the storage tubes down to the next line. At the end of the frame, the vertical-synchronizing pulse is employed to cause the slow-step sweep generator to move, or reset, the cathode-ray beams and the storage tubes back to the initial storage position in all the tubes. Deflection circuits of the type designated as fast-step sweep generator and slow-step sweep generator are well known in the art. The ones employed with the embodiment of the invention which was constructed are of the digital deflection type and are described and shown in detail in an article entitled "A Storage System for Use With Binary-Digital Computing Machines," by Williams and Kilburn, published in March 1949, pp. 81 et seq. in the Proceedings of the Institute of Electrical Engineers, part III, vol. 96.

Thus far, there has been described how the information corresponding to the run-end position of all the runs in a picture are stored in the storage tube. The remainder of the apparatus shown in the drawing may be employed for reading the information out of the storage tubes in sequence and at a constant rate for either transmission or more permanent storage. The reading ends of the storage tubes also have all their deflection plates operated in parallel. A readout sweep generator 40 causes all the six cathode-ray beams to scan the stored patterns at a rate sufficient to read out a frame of information in one frame interval. A simpler scheme for readout is to have constant frequency horizontal and vertical sweeps. To this end, a readout sync generator 42 provides necessary sync pulses for driving the readout sweep generator. It is also possible to economize on transmission time to some extent by sweeping along each horizontal line of the storage tube only until all the information in that line has been read out. This length will be different in each case on account of the varying distribution of information in the original picture.

The signals from the six storage tubes may be mixed in a multiplexer 44, which may be, for example, an electronic six-pole selector switch, operated at a frequency of, for example, 300,000 complete selections per second. The output of the multiplexer is a composite signal which may be considered either as representing the run end position and video brightness, or intervals over which video brightness levels exist. Synchronizing signals are added by means of the synchronizing signal inserter 46 and the resultant signal is fed to the transmitter 48 for transmission over the air.

As previously indicated, no change need be made in the receiver described in the previous application by this inventor for decoding these signals. By eliminating the necessity for recording the first and second number each time the counter 18 fills and substituting therefor a recording each time a run equals 32 bauds, a considerable savings in recording space as well as subsequent transmission, is obtained. Although the means for detecting the occurrence of a run length equal to 32 bauds is shown as a counter, this is by way of example, and not to be considered as a restriction on the invention. Any other arrangement for detecting the occurrence of the interval or the number of bauds required for filling the run-length counter starting from its zero count condition, may be employed without departing from the spirit or scope of this invention.

I claim:

1. In a system for reducing the amount of information required for transmitting signals having intervals with substantially no changes in signal characteristics by representing each different signal characteristic by a different first number representative signal and an associated second number representative signal representative of the duration of said first number representative signal without change, and there is included in said system a means for recording said first and associated second number representative signals which occur each time a first number representative signal changes, a means for sequentially establishing predetermined intervals, and a means responsive to the occurrence of each said sequentially established predetermined intervals for energizing said means for recording to record an associated first and second number representative signals at that time, the improvement in said system for eliminating recording upon the occurrence of each said sequentially established predetermined interval comprising means for indicating the elapse of a predetermined interval from the time of a change in a first number representative signal, and means responsive to an output by said means for indicating the elapse of a predetermined interval from the time of a change in a first number-representative signal to energize said means for recording to record a first and second number representative signal at that time.

2. In a system for reducing the amount of information required for transmitting signals having intervals with substantially no changes in signal characteristics, by representing each different signal characteristic by a different first number representative signal and an associated second number representative signal representative of the number of clock pulses occurring while a first number does not change, and there is a means for recording said first and associated second number representative signal each time there is a change in a first number representative signal and each time a multiple of a predetermined number of clock pulses occurs, the improvement in said system for eliminating the recording of a first and second number representative signal each time a multiple of a predetermined number of clock pulses occurs comprising means for detecting the occurrence of a predetermined number of clock pulses from the time of change in a first number representative signal, and means responsive to an output from said means for detecting to energize said means for recording to record a first and second number representative signal at that time.

3. In a system for reducing the bandwidth of signals having video signal characteristics, said system being of the type wherein a plurality of first number-representative signals are generated in sequence representative of said signals, and a continuously running first counter provides a second number representative signal each time a first number representative signal changes in value indicative of the elapsed interval before a change in said first number value occurs and there are means for recording a first number representative signal and an associated second number representative signal each time a first number representative signal changes in value, the improvement in said system comprising a second counter, means for driving said second counter concurrently with said first counter, means for resetting said second counter to an initial count condition each time a first number representative signal changes in value, and means responsive to said second counter attaining its maximum count to energize said means for recording to record said first and second number-representative signals at that time.

4. In a system for reducing the amount of information required for transmitting signals having intervals with substantially no changes in signal characteristics, wherein there is a means for sequentially generating first number-representative signals representative of signal characteristics, a clock-pulse generator drives a first counter whose count output provides second number-representative signals representative of the duration of a first number-representative signals without change, and there are means for recording a first number representative signal and an associated second number representative signal each time there is a change in a first number representative signal and each time said first counter attains a full count, the improvement in said system for eliminating the recording each time said first counter fills comprising a second cyclic counter having the same count capacity as said first counter, means to drive said second counter from said clock-pulse generator concurrently with said first counter, means for resetting said second counter to an initial count condition responsive to a change in a first number representative signal, and means responsive to said second counter attaining a full count to energize said means for recording to record the first number representative signal and second number representative signal existing at the time.

References Cited in the file of this patent

UNITED STATES PATENTS

| | | |
|---|---|---|
| 2,676,202 | Filipowsky | Apr. 20, 1954 |
| 2,732,424 | Oliver | Jan. 24, 1956 |
| 2,824,904 | Toulon | Feb. 25, 1958 |